Aug. 3, 1937.  J. W. FAY  2,088,848
COOKING UTENSIL COVER
Original Filed Dec. 5, 1935    2 Sheets-Sheet 1
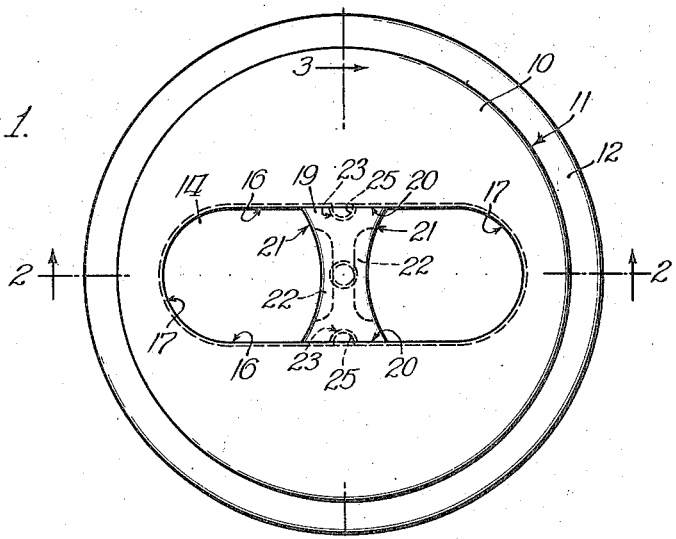
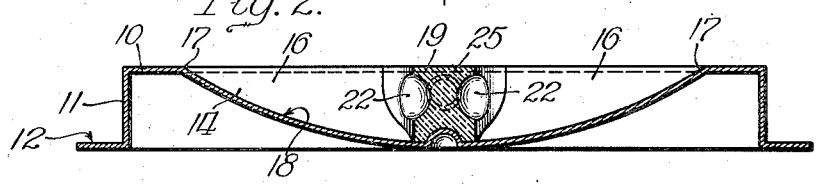
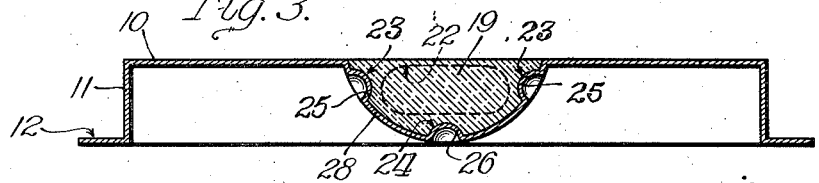
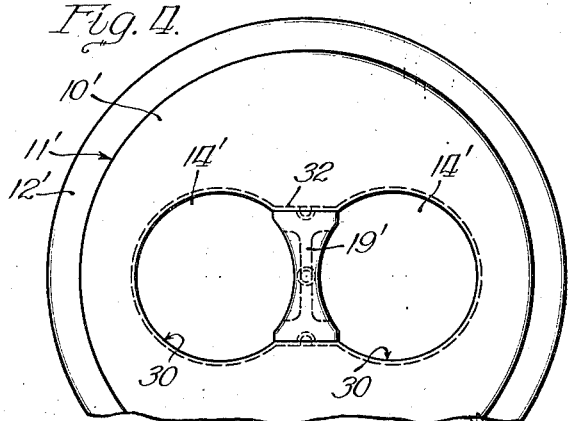
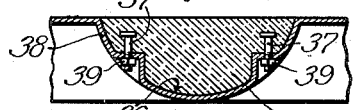
Inventor:
Joseph W. Fay Aug. 3, 1937.  J. W. FAY  2,088,848
COOKING UTENSIL COVER
Original Filed Dec. 5, 1935    2 Sheets-Sheet 2
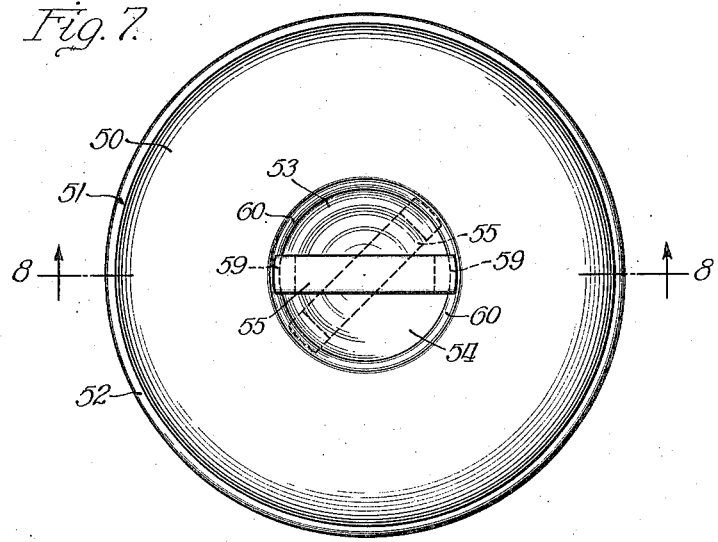
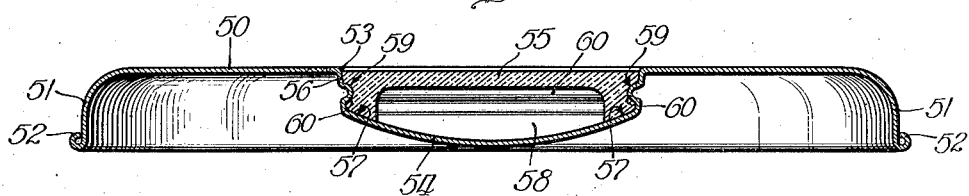
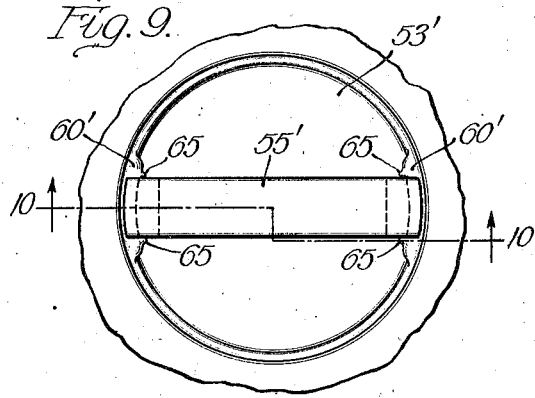
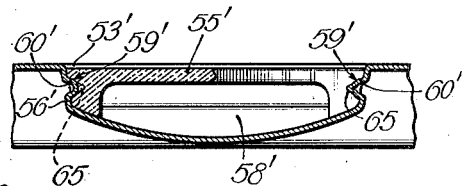
Inventor:
Joseph W. Fay Patented Aug. 3, 1937

2,088,848

UNITED STATES PATENT OFFICE 2,088,848

COOKING UTENSIL COVER

Joseph W. Fay, Villa Park, Ill., assignor of one-half to Ersyl F. Chambless, Chicago, Ill.

Application December 5, 1935, Serial No. 52,965
Renewed June 22, 1937

11 Claims. (Cl. 53—1)

This invention relates to cooking utensil covers, and consists in the combinations, constructions, and arrangements hereinafter described and claimed.

One of the main objects of the invention is to provide an improved handle arrangement depressed to position the top of the handle substantially flush with or below the top of the cover to permit stacking or arrangement of a plurality of utensils in superposed relation.

It is also an object of the invention to provide a novel mounting of the handle and a novel manner of attaching the same to the cover.

Further objects and advantages of the invention will be apparent from the following detailed description, taken in connection with the accompanying drawings in which:

Figure 1 is a plan view of one embodiment of the invention;

Figure 2 is a sectional view taken on the line 2—2 of Figure 1;

Figure 3 is a sectional view taken on the line 3—3 of Figure 1;

Figure 4 is a plan view of another embodiment of the invention;

Figure 5 is a fragmentary detail section showing another manner of attaching the handle to the cover;

Figure 6 is a fragmentary detail section similar to Figure 5 showing another manner of attaching the handle to the cover;

Figure 7 is a plan view of another embodiment of the invention;

Figure 8 is a sectional view taken on the line 8—8 of Figure 7;

Figure 9 is a fragmentary plan view of another embodiment of the invention; and

Figure 10 is a sectional view taken on the line 10—10 of Figure 9.

Referring to the drawings, the cover shown in Figures 1 to 3, inclusive, comprises a top wall 10 of circular form, provided peripherally with a downturned flange 11, the lower margin of which is provided with an out-turned flange 12, the bottom of which constitutes the bottom of the cover. The cover may be made of sheet metal or other suitable material, finished as desired.

The top wall 10 is provided with an elongated depression 14 having parallel sides at 16 and rounded at the ends at 17. This depression 14 is of maximum depth intermediate its ends, as shown in Figure 2, and is curved upwardly at 18 to the rounded ends 17. The depression 14 may be formed by die means, or in any other suitable or preferred manner, and its depth and width are such as to permit an easy hand grip on the handle 19 which is mounted in the intermediate portion of the depression 14 with its upper surface positioned substantially flush with or below the top wall 10 of the cover to permit stacking or arrangement of a plurality of utensils in superposed relation.

The handle or grip member 19 is preferably formed of wood, "Bakelite", or any other suitable heat insulating material, but, of course, other materials are contemplated within the scope of the broader of the appended claims. The handle 19 is disposed between and at right angles to the parallel side walls 16, and its length is such as to fit snugly therebetween, with the flat or square ends 20 of the handle abutting the side walls 16. The sides 21 of the handle are concave to provide a concavo-concave or doubly concave form to facilitate an easy hand grip on the handle and, at the same time, providing ends of sufficient extent for attachment of the handle to the cover. These concave sides 21 preferably have depressions 22 further to facilitate the desired hand grip on the handle.

The bottom of the handle is rounded as shown in Figure 3 to conform with the transverse rounding of the depression 14. For the purpose of attaching the handle to the cover, the ends 20 of the handle are provided with recesses or depressions 23. The rounded bottom of the handle may be provided with recesses or depressions 24. The side walls 16 are pressed or indented at 25 into the recesses 23, and the transversely rounded intermediate portion of the depressed wall 28 is pressed or indented at 26 into the recesses 24, thereby, with the engagement of the indentations 25 with the recesses 23, securing the handle 19 firmly and rigidly in place without perforating the cover.

The embodiment of the invention shown in Figure 4 is similar to the embodiment shown in Figures 1 to 3, inclusive, except that the depression 14' is of generally figure eight form, having the enlarged generally rounded ends 30 and the intermediate neck 32 with its parallel walls between which the handle 19' is mounted and secured as in the preceding embodiment of the invention. This embodiment of the invention permits making the hand receiving ends of the depression of any desired size without making the handle of a length equal to the width of these hand receiving ends.

In the embodiment of Figure 5, the handle indicated at 35 is secured in the depression 36 by screws 37. When the handle is of "Bakelite"

or similar material, the screws 37 may be anchored in the handle, as by molding the same therein. When the handle is applied to the cover, these screws 37 extend through openings in offsets in the wall 38 and have threaded engagement with nuts 39 for securing the handle firmly and rigidly in place.

The embodiment shown in Figure 6 is similar to the embodiment of Figure 5 except that, instead of screws, rivets 40 are anchored in the handle 41 as by molding the same therein. When the handle 41 is applied to the cover, these rivets extend through openings in the offsets in the wall 42, and their lower ends are headed or riveted over to secure the handle firmly and rigidly in place.

The cover shown in Figures 7 and 8 comprises a top wall 50 of circular form provided peripherally with a downturned flange 51 beaded along its lower edge at 52. Like the other embodiments of the invention, this cover may be made of sheet metal or other suitable material finished as desired.

The top wall 50 is provided with a circular depression 53, the bottom 54 of which is of downwardly convex form. The handle or grip 55 is disposed within the depression 53 with the top of the handle disposed substantially flush with or below the top wall 50 and fits diametrically between the opposite sides of the side wall 56 of the depression. The handle 55 is preferably formed of wood, "Bakelite", or any other suitable heat insulating material, and its opposite ends are formed at 57 to engage the bottom 54 of the depression, whereas, intermediate these ends 57, the handle is open at 58 to permit a circulation of air beneath the handle to prevent undue heating of the same and to facilitate the desired hand grip on the handle.

The ends of the handle 55 are provided with grooves 59, and the side wall 56 of the depression has an annular rib 60 pressed into the grooves 59 to secure the handle to the cover. The handle may be free to turn in the depression and around the rib 60 as shown in dotted lines in Figure 7, or it may be secured against turning as, for example, by indenting the side wall of the depression at opposite sides of the ends of the handle.

The embodiment of Figures 9 and 10 is similar to the embodiment of Figures 7 and 8 except that the rib portions 60', instead of being of annular form, extend only along the ends of the handle 55'. The side wall 56' of the depression 53' is indented at 65 at opposite sides of the opposite ends of the handle to secure the grooved ends of the handle against turning out of engagement with the rib portions 60'. The grooves in the ends of the handle are shown at 59', and intermediate the ends the handle is open, as before, at 58' for circulation of air therebeneath.

I do not intend to be limited to the precise details shown or described.

I claim:

1. As a new article of manufacture, a metallic utensil cover having a top wall turned down within its area to form a depression, and a heat insulating handle fitting within the depression intermediate the ends thereof and extending between the opposite sides of said depression, the ends of said handle having interlocking engagement with the turned down wall of the cover at opposite sides of the depression, said depression being of sufficient depth and breadth at opposite sides of said handle to permit a convenient hand grip on said handle.

2. As a new article of manufacture, a metallic kitchen utensil cover having a top wall provided with a depression having side walls disposed along its intermediate portion, a heat insulating handle fitting between said side walls intermediate the ends of the depression, said depression being of sufficient depth and breadth at opposite sides of said handle to permit an easy hand grip on said handle, recesses in said handle, and indentations pressed in from said cover and into said recesses for attaching the handle to the cover.

3. As a new article of manufacture, a metallic utensil cover having a top wall provided with a depression having opposite side wall portions, a heat insulating handle fitting within said depression intermediate the ends thereof and extending between said opposite side wall portions with its ends abutting said opposite side wall portions, and means on said opposite side wall portions and the abutting ends of said handle for securing the opposite ends of the handle to said opposite side wall portions.

4. As a new article of manufacture, a kitchen utensil cover having a top wall provided with a depression having maximum depth and parallel side walls intermediate its ends and curved upwardly from said intermediate portion to the ends of the depression, said depression being rounded transversely at the bottom, a heat insulating handle disposed at the intermediate portion of the depression and at right angles to said side walls, said handle having a rounded bottom fitting the transverse rounding of the bottom of the depression and square ends abutting said side walls, recesses in the ends and rounded bottom of the handle, and indentations pressed in from the side walls of the cover and from the bottom of the depression and into said recesses for attaching the handle to the cover.

5. As a new article of manufacture, a metallic kitchen utensil cover having a top wall provided with a depression having parallel side walls disposed along its intermediate portion, a heat insulating handle fitting between said side walls intermediate the ends of the depression and having ends abutting said side walls, recesses in the ends of said handle, and indentations pressed in from the side walls of the depression and into said recesses for attaching the handle to the cover.

6. As a new article of manufacture, a metallic kitchen utensil cover having a top wall provided with a depression having parallel side walls disposed along its intermeliate portion, a heat insulating handle fitting between said side walls intermediate the ends of the depression and having square ends abutting said side walls, recesses in the ends of said handle, and indentations pressed in from the side walls of the depression and into said recesses for attaching the handle to the cover, the opposite sides of said handle being of concave formation with finger grip depressions therein.

7. As a new article of manufacture, a metallic kitchen utensil cover having a top wall provided with a generally eight-shaped depression with a restricted intermediate portion and enlarged finger grip depressions at opposite ends thereof, and a heat insulating handle fitting between the sides of the restricted intermediate portion of said depression and attached to the cover.

8. As a new article of manufacture, a kitchen utensil cover having a top wall provided with a depression, a heat insulating handle disposed in said depression intermediate the ends thereof with the top of the handle disposed substantially flush with the top of the cover, recesses in said handle, and indentations pressed in from said cover and into said recesses for attaching the handle to the cover.

9. As a new article of manufacture, a metallic utensil cover having a top wall depressed to form a hand-receiving depression, a heat insulating handle coextensive with the width of said hand-receiving depression fitting within said depression intermediate the ends thereof, said handle extending between the opposite sides of the depression and to the full depth of said depression, and means on said handle and cooperating with the depressed wall of said hand-receiving depression for securing said handle to said cover.

10. As a new article of manufacture, a metallic kitchen utensil cover having a top wall provided with a depression and a heat insulating handle fitting between and secured to opposite sides of the side wall of said depression intermediate the ends of the depression, said handle being open between the opposite ends for circulation of air in the depression and beneath the handle.

11. As a new article of manufacture, a metallic kitchen utensil cover having a top wall provided with a circular depression, an annular rib on the side wall of said depression, and a heat insulating handle disposed in said depression and fitting diametrically between opposite sides of said side wall intermediate the ends of the depression with grooves in its opposite ends engaging said rib to secure the handle to the cover.

JOSEPH W. FAY.